United States Patent [19]

Ohnishi et al.

[11] Patent Number: 5,200,282
[45] Date of Patent: Apr. 6, 1993

[54] NICKEL ELECTRODE AND ALKALINE BATTERY USING THE SAME

[75] Inventors: Masuhiro Ohnishi; Masaharu Watada; Masahiko Oshitani, all of Takatsuki, Japan

[73] Assignee: Yuasa Battery Co. Ltd., Takatsuki City, Japan

[21] Appl. No.: 769,526

[22] Filed: Oct. 2, 1991

Related U.S. Application Data

[63] Continuation of Ser. No. 500,511, Mar. 28, 1990, abandoned.

[30] Foreign Application Priority Data

Jun. 15, 1989 [JP] Japan .................................. 1-152786
Aug. 17, 1989 [JP] Japan .................................. 1-212767

[51] Int. Cl.$^5$ ............................................ H07M 4/74
[52] U.S. Cl. ...................................... 429/223; 429/241
[58] Field of Search ................ 429/223, 241; 29/623.5

[56] References Cited

U.S. PATENT DOCUMENTS 3,926,671 12/1975 Gutjahr et al. ...................... 429/223
4,844,999 7/1989 Oshitani et al. ...................... 429/223

Primary Examiner—Stephen Kalafut
Attorney, Agent, or Firm—Watson, Cole, Grindle & Watson

[57] ABSTRACT

A nickel electrode for use in an alkaline battery using a network-like alkaline-proof metal mesh having pores at the inside thereof as a core metal current collector, as well as an alkaline battery using such a nickel electrode. Inexpensive nickel electrode having high performance, great capacity can be obtained at high productivity.

8 Claims, 10 Drawing Sheets

Fig. 6a  Fig. 6b  Fig. 6c standing — charging

NICKEL ELECTRODE AND ALKALINE BATTERY USING THE SAME

This application is a continuation of Ser. No. 500,511, filed Mar. 28, 1990, now abandoned.

BACKGROUND OF THE INVENTION

1. Field of the Invention

The present invention concerns a nickel electrode for use in an alkaline battery and an alkaline battery using such a nickel electrode.

2. Description of the Prior Art

Production processes for producing a nickel electrode for use in a nickel-cadmium battery known at present include a so-called sintering method wherein a finely porous substrate (80% porosity) prepared by sintering nickel powder is impregnated on a perforated steel sheet with a nickel salt under a reduced pressure and then the nickel salt is converted into nickel hydroxide in an aqueous alkaline solution, and a so-called pasting method wherein nickel hydroxide powder in a slurry form is loaded on a highly porous current collector (90~98% porosity) made of sintered, alkaline-proof metal fibers.

The former method was developed during World War II, and it has been improved for every particular portion upto now. However, no principal changes have been made and it requires repeating, over several cycles, a series of complicated loading steps, that is, solution impregnation alkaline soaking water rinsing and drying. Accordingly, it has a drawback of being expensive. Further, since the energy density is limited to about 400 mAh/cc due to the structural factor, it has become difficult to satisfy the market needs along with the reduction for the weight and size of portable electronic equipment which has been under rapid progress at present (requiring about 600 mAh/cc). The pasting method has been developed in recent years for simplifying the production steps from different points of view, such as for current collectors, active materials and additives. In addition, it can attain the high energy density substantially capable of coping with present market needs. However, since sintered, highly porous alkaline-proof metal fibers used for the current collector are expensive, it still involves the drawback that the product cost is high for which a substantial improvement is demanded.

For overcoming various problems in such production steps and cost, it has been demanded for an ultimate electrode like that existent lead electrodes using only the core metal for the substrate and many researchers have made various studies. However, the present technique still involves various problems and has not yet been put to practical use.

The present invention will be described together with the results of our previous studies reaching the invention referring to drawings.

DESCRIPTION OF THE INVENTION

Figure 1:
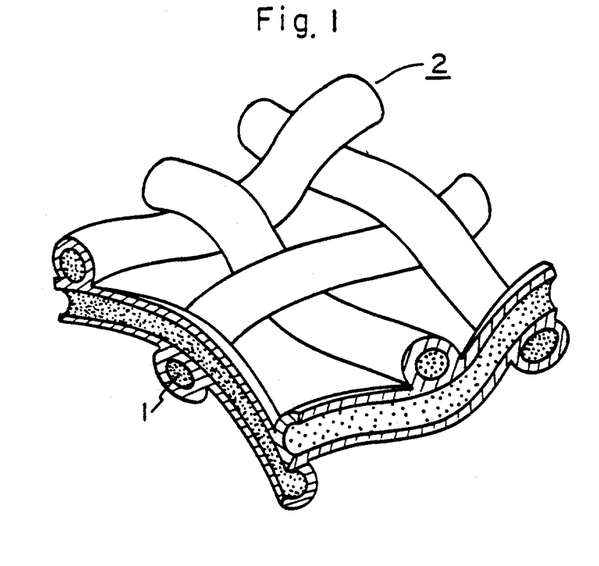
FIG. 1 shows a steric model of a nickel mesh current collector.
Figure 2A:
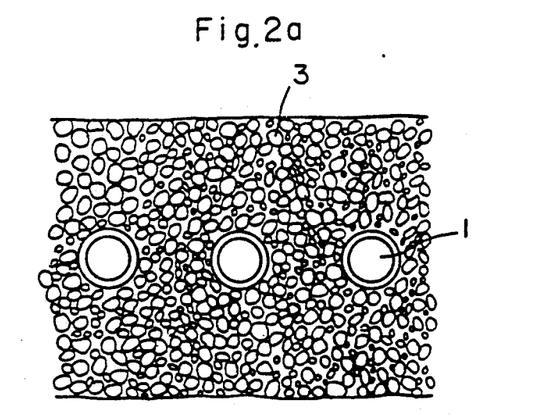
FIGS. 2(a), (b) show a model, in cross section, of an electrode before and after pressing.
Figure 2B:
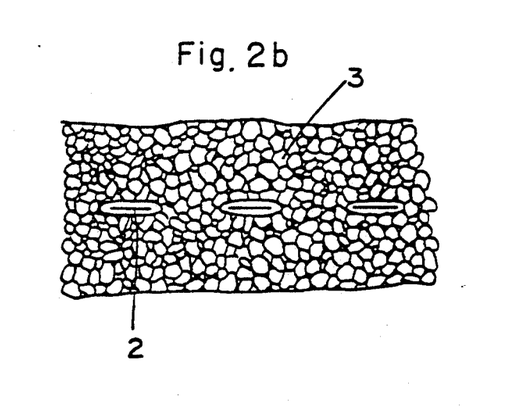

Upon starting the study on such an ultimate electrode, we have at first studied the current collector. Initially, a study was made on a method of using a nickel foil as a core metal current collector and coating active material, thereby obtaining an inexpensive nickel electrode (Japanese Patent Laid Open No. Sho 61-263047). In this method, however, since adhesion between the particulate active material and the nickel foil current collector was insufficient, the particulate active material tended to become detached. And, since the foil had little mechanical strength, it tended to crease at its surface. With such problems, the method has not yet reached practical use. Then, for improving these drawbacks, we have noted a method of using mesh-like nickel wires as a current collector. However, it has been found that fabrication of nickel wires into a mesh-like form requires an increased cost. Then, we have noted an inexpensive mesh-like alkaline-proof metal 1 substrate having pores 2 at the inside (refer to FIG. 1) as material for current collector. This material is obtained by applying a nickel coating to a mesh-like cloth and, subsequently, heating the combination to remove the inner cloth. As a result, it has been found that this material has not only mechanical strength and cost reduction but also various merits, such as nickel having no concerns with cell reactions is not contained at the inside of the current collector and inner pores can be removed by pressing the electrode to obtain high energy density (refer to FIGS. 2(a) and (b)). Therefore we have considered that this material is effective as a current collector material. In a case of using this material (hereinafter simply referred to as a mesh current collector) as a current collector, it has been further found that the utilization ratio of the active material (hereinafter simply referred to as the utilization ratio) is extremely low if the mesh current collector is merely coated with the active material 3.

As described by Barnard et al. in J. Appl. Electrochem. 10, 127 (1980), it has been known that the utilization ratio of nickel hydroxide is in a reverse proportion with a distance between a current collector and particles of active material. Considering this theory, it has been assumed that the utilization ratio is lowered in the case described above because of the distance between the mesh current collector and the outermost active material paticles. Accordingly, in order to attain a high utilization ratio in using a mesh current collector, it is necessary to improve the conductivity of the electrode. The electrode is generally comprised of three portions, that is, a current collector portion, a boundary portion between the current collector and the first layer of the active material layer adjacent therewith (hereinafter simply referred to as a boundary portion), and an active material layer portion. Then, the study was made for each of the portions of the electrode individually.

Among them, the conductivity of the current collector portion is sufficient with the present structure and there is no problem to be solved. Accordingly, a study as to the effect of the conductivity of the boundary portion on the utilization ratio was carried out at first.

In this boundary portion, electrons are transferred between the current collector made of metal and the active material of metal hydroxide. Thus the boundary portion is different from the boundary between each of the particles of the metal hydroxide in the active material layer. And it is considered to play an important role for electrode reaction. Accordingly, this gives a considerable effect on the utilization ratio. The current collector and the active material are usually in contact with each other only physically at the boundary portion. Thus, it is deduced to lead to the reduction of the conductivity. Further, since corrosion occurs at the surface of the current collector in the course of the electrode reaction even when the collector is made of alkaline-proof metal, corrosion products formed at the boundary portion bring about a reduction in conductivity.

Figure 3:
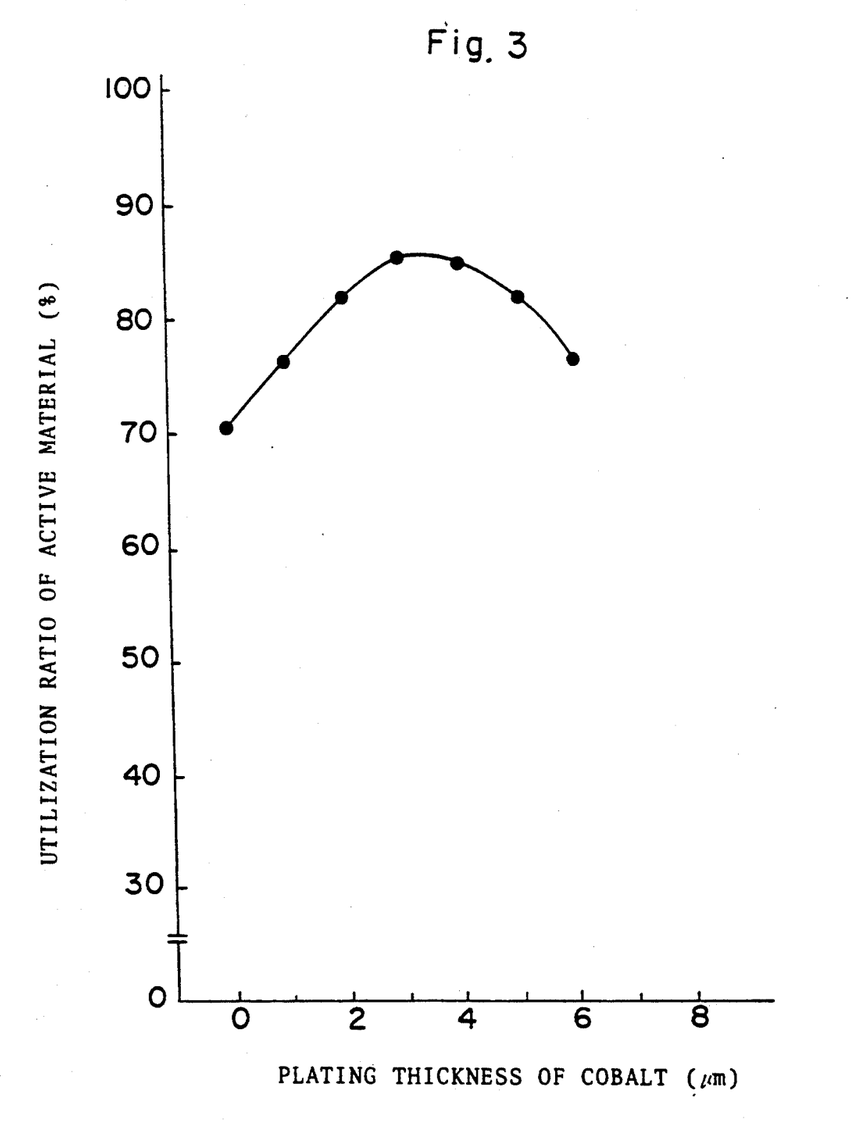
FIG. 3 shows a relationship between the coating thickness of cobalt at the surface of the mesh current collector and the utilization ratio of the material.

In order to provide the boundary portion with high conductivity, it is necessary to firmly bond the current collector and the active material with a layer possessing high conductivity and electrochemical irreversibility. At present, cobalt oxyhydroxide can be mentioned as the material possessing such property in an alkaline solution at high concentration. As a method of forming a layer of cobalt oxyhydroxide at the boundary portion, it is considered to use a mesh current collector which is coated with cobalt or on whose surface a cobalt compound is electrolytically deposited and then electrochemically converted into cobalt oxyhydroxide. Since there may be a possibility that the cobalt compound is chemically dissolved and diffused into the active material layer, it is considered that the former method is more appropriate. In the former method, the coating thickness of cobalt must be suitable in coating the current collector with cobalt. If the coating thickness is excessive, the coated cobalt can not completely be converted into cobalt oxyhydroxide, being passivated as the cobalt compound of low conductivity at the surface of the current collector. Thus the model experiment was made by using various current collectors with different coating thickness of cobalt. As a result, it has been found that although the utilization ratio increases along with the increase of the coating thickness upto 3 $\mu$m, the utilization ratio is reduced along with the increase of the coating thickness if it exceeds 3 $\mu$m. If the thickness exceeds 5 $\mu$m, the utilization ratio is further reduced than the case of not coating with cobalt. As a result of X-ray diffractiometry after the experiment, presence of metal cobalt was observed in a case where the coating thickness exceeds 5 $\mu$m. Both of the metal cobalt remained and cobalt oxyhydroxide possess high conductivity. However, since direct contact of the metal cobalt (oxydation number 0) and cobalt oxyhydroxide (oxydation number III) is extremely instable, it is considered that a cobalt compound film of low conductivity is present between them. Accordingly, the coating thickness is appropriately within a range from 2 to 5 $\mu$m in coating the surface of the current collector with cobalt. FIG. 3 shows a relationship between the cobalt coating thickness at the surface of the current collector and the utilization ratio in an electrode with a total thickness of about 200 $\mu$m and a theoretical capacity of about 400 mAh/cc. Further, since the oxyhydroxide layer is formed at the surface of the current collector by this method, it can also obtain a further effect of improving the corrosion resistance of the current collector, thereby extending the working life of the electrode.

Next, the effect of the conductivity of the active material layer on the utilization ratio will be discussed as follows. As described above, since the mesh current collector has no three dimensional structure being different from sintered highly porous fiber current collector, a distance arises from the thickness of the pasted active material layer between the surface of the electrode and the current collector. Accordingly, a potential difference arises from the conductivity of the active material layer between the current collector and the surface of the electrode, which leads to competitive reactions depending on the difference of the distance from the current collector upon charging. The competitive reactions result in $\gamma$-NiOOH at the boundary portion. Since the formation of $\gamma$-NiOOH causes the active material particles to expand and shrink along with charge and discharge, adhesion formed in the boundary portion described above is broken. In order to inhibit the formation of $\gamma$-NiOOH and attain a high utilization ratio, it is necessary to improve the conductivity for the entire active material layer, thereby reducing the potential difference due to the thickness of the active material layer.

It has been generally known that an improvement in the conductivity of the active material layer can be attained by adding a powder of conductive material, such as carbon and nickel, or a powder of a divalent cobalt compound, such as cobalt monoxide and cobalt hydroxide (refer to Japanese Patent Laid Open Sho 62-256366), to the active material. The aim of the former method is improvement of the conductivity in the active material layer by addition of the highly conductive material, but it involves a problem in view of the energy density since it is necessary to add an extremely great amount of the conductive material. Further, since it is necessary to press the electrode on both sides at a high pressure, there is a problem in view of the production. The latter method also aims at improvement of the conductivity of the active material layer by the formation of conductive network of the cobalt oxyhydroxide in the layer. The divalent cobalt compound added to the active material is once converted into blue complex ions in an alkaline solution at high concentration and redeposited on the surface of the active material, which are converted into cobalt oxyhydroxide possessing conductivity by the first charge. This method is effective in using the sintered highly porous fiber current collector in which the distance between the active material and the current collector is relatively short. However, it is not sufficient for the mesh current collector in which this distance is greater than the effective distance of the conductive network. When such a conventional method has been applied actually to the mesh current collector, only an extremely low utilization ratio of the active material can be obtained. Accordingly, for improving the conductivity of the active material layer in using the mesh current collector, merely the addition method as in the prior art is still insufficient and it is necessary for a further consideration on the additives.

Figure 4:
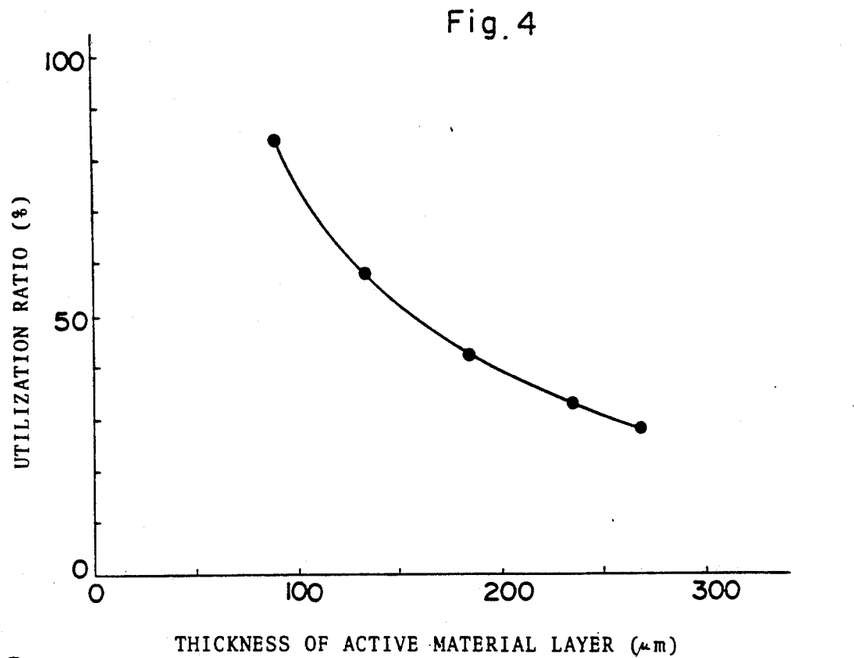
FIG. 4 shows a relationship between the thickness of the active material layer and the utilization ratio.
Figure 5:
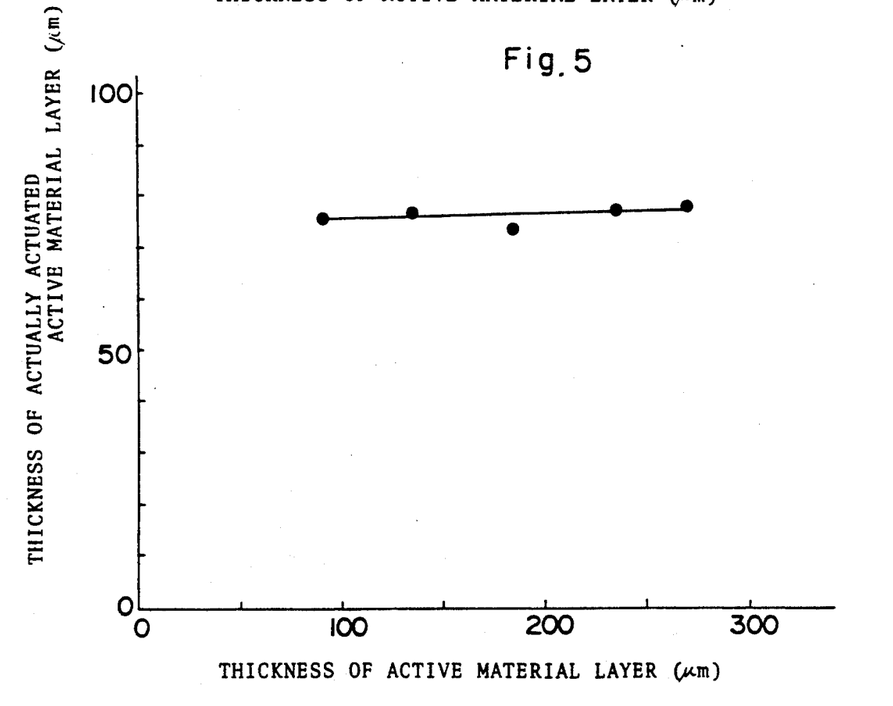
FIG. 5 shows a relationship between the thickness of the active material layer and the thickness of the actuated active material layer.

In view of the above, a closer study was made at first on the method of adding a divalent cobalt compound which is one of the most excellent method applied at present to nickel electrodes. In the case of using this method for the mesh current collector, it is necessary to consider the effective distance of the conductive network. Since it has not been clear for the exact value of the effective distance, the value has been estimated approximately by the following method. An electrode is prepared by pasting an active material comprising 10% of cobaltous monoxide and 90 wt % of nickel hydroxide to a nickel foil current collector. The thickness of the electrode is controlled by varying the amount of the active material. A charge-discharge test is conducted by using the electrode to measure the utilization ratio. The results are shown in FIG. 4. Considering the steric condition of this electrode, the discharge of the active material occurs from the vicinity of the current collector. Thus the thickness of actually actuated active material layer can be calculated by a mathematical product of the thickness of the active material layer and its utilization ratio. FIG. 5 is obtained by applying the mathematical process to FIG. 4. It can be seen from FIG. 5 that the thickness of the actuated active material layer has a substantially constant value even if that of the pasted active material layer is varied. Therefore it is estimated that the effective distance of the conductive network formed in this case is about 70 to 80 $\mu$m.

Figure 6A:
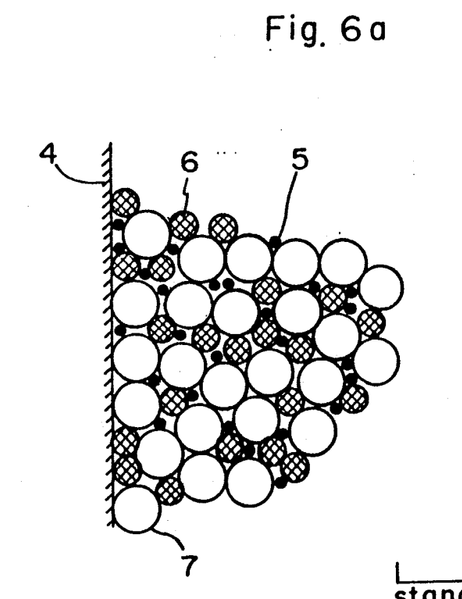
FIGS. 6(a)~(c) show a model for forming a conductive network in adding the conductive material and the divalent cobalt compound in combination.
Figure 6B:
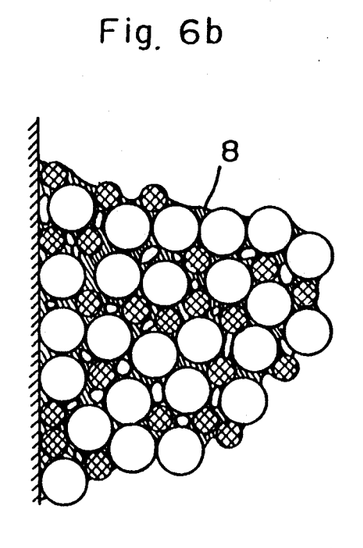
Figure 6C:
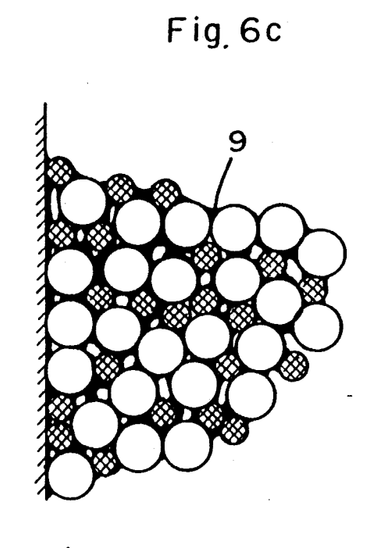

Accordingly, it is necessary to increase the effective distance of the conductive network in order to attain a high utilization ratio in using the mesh current collector. As one of such attempts, although it has been studied to form a conductive network enhanced by increasing the addition amount of the divalent cobalt compound, it has not been possible to attain an improvement in the utilization ratio. Then a study was made on a addition method combined the divalent cobalt compound with the conductive material. This attempt has an aim of forming a conductive network in which cobalt oxyhydroxide 9 connects each of the conductive material 6. Namely, the divalent cobalt compound 5 added to the active material 7 with the conductive material 6 is dissolved and re-deposited on the surface of the conductive material, the active material and the current collector 4, which are converted into cobalt oxyhydroxide 9 by the first charge. FIG. 6(a)~(c) show a model of forming the conductive network. In this case, the conductive material 6 has to be alkaline-proof and causing no or less change due to the electrode reactions. That is, alkaline-proof metal, alloy or metal oxide, conductive material coated with alkaline-proof metal or carbon are appropriate. This addition method has proved to improve the utilization ratio. Further, it has become apparent that the conductive material has an effect of improve the conductivity of the active material in a smaller addition amount as compared with the case where the conductive material is added alone.

Since this conductive network is formed by connecting each particle of the conductive material by cobalt oxyhydroxide, a network connecting "line" is more effective than a network connecting "point" as powder. Thus fibrous shape is more effective for the conductive material. However, since too long fibers may cause an heterogenous state in the active material layer, its length is desirably within such a range as not causing heterogenity.

By improving the conductivity at the boundary portion and the active material layer with the aforementioned method, it is possible to obtain high utilization ratio also in using the mesh current collector. It is, accordingly, an object of the present invention to provide an inexpensive nickel electrode of high performance, great capacity and high productivity, as well as an alkaline battery using such a nickel electrode.

SUMMARY OF THE INVENTION

A first aspect of the present invention, for attaining the foregoing object, resides in a nickel electrode for use in an alkaline battery in which a network-like alkaline-proof metal mesh having pores at the inside thereof is used as a core metal current collector.

A second aspect resides in a nickel electrode for use in an alkaline battery in which a layer comprising a highly conductive and electrochemically irreversible material is formed at the boundary between the current collector and the first layer of the active material adjacent therewith.

A third aspect resides in a nickel electrode for use in an alkaline battery, in which the aforementioned layer comprises cobalt oxyhydroxide.

A fourth aspect of the present invention resides in a nickel electrode for use in an alkaline battery, in which the layer comprising cobalt oxyhydroxide is formed from metal cobalt coated or a cobalt compound electrolytically deposited on the surface of the current collector.

A fifth aspect of the present invention resides in a nickel electrode for use in an alkaline battery, in which the thickness of the cobalt coating on the surface of the current collector is within a range from 2 to 5 $\mu$m.

A sixth aspect of the present invention resides in a nickel electrode for use in an alkaline battery, in which the active material comprises nickel hydroxide powder added divalent cobalt compound powder in combination with conductive material powder.

A seventh aspect of the present invention resides in a nickel electrode for use in an alkaline battery, in which the divalent cobalt compound is at least one or more of CoO, $\alpha$-Co(OH)$_2$ and $\beta$-Co(OH)$_2$.

An eighth aspect of the present invention resides in a nickel electrode for use in an alkaline battery, in which the conductive additives are selected from alkaline-proof metal, conductive material coated with alkaline-proof metal and carbon.

A ninth aspect of the present invention resides in a nickel electrode for use in an alkaline battery, in which the conductive additive is short fibrous.

A tenth aspect of the present invention resides in a nickel electrode for use in an alkaline battery, in which the active material is pasted on the current collector, followed by drying and, subsequently, pores at the inside of the current collector are removed by pressing the electrode.

An eleventh aspect of the present invention resides in an alkaline battery manufactured by assembling the nickel electrode without forming into a cell, allowing to stand after injection of an electrolyte, dissolving and re-depositing the divalent cobalt compound additives and then applying the first charge.

EXAMPLE OF THE PRESENT INVENTION

The present invention will be described more in details referring to examples.

EXAMPLE 1

An aqueous solution comprising carboxymethyl cellulose as a viscosity improver was respectively added to a mixture of 80% by weight of the nickel hydroxide powder and 20% by weight of the cobalt monoxide powder (hereinafter simply referred to as A); a mixture of 80% by weight of the nickel hydroxide powder and 20% by weight of the carbon powder (hereinafter simply referred to as B); and a mixture of 80% by weight of the nickel hydroxide powder, 10% by weight of the cobalt monoxide powder and 10% by weight of the carbon powder (hereinafter simply referred to as C), to form three kinds of slurry active materials.

These slurries were pasted to a nickel mesh current collector $\alpha$ of 80 $\mu$m wire diameter applied with plating of cobalt of 3 $\mu$m thickness and a nickel mesh current collector $\beta$ not applied with cobalt plating respectively, which were dried and pressed into nickel electrodes each of 600 $\mu$m (0.6 mm) thickness.

These nickel electrodes were combined with a pasted cadmium electrode as a counter electrode, to which KOH at d=1.26 was injected to obtain solution type cells. After leaving them for 24 hours, tests were conducted by charging at 0.1 CA×15 hr—discharging at 0.2 CA (final voltage: 1.00 V) at a temperature of 20° C. repeatedly for 10 cycles.

Figure 7:
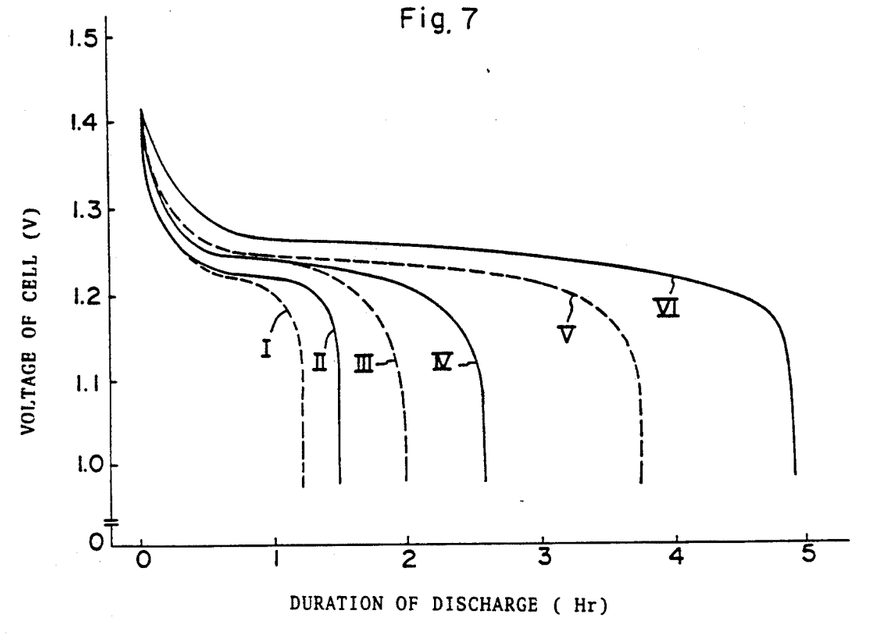
FIGS. 7 and 8 show the synergistic effect obtained by the combined addition of the conductive material and cobalt monoxide.

FIG. 7 shows cell discharge characteristics in respective cases. In the figure, conditions for the nickel electrodes I~VI are shown in the following Table 1.

TABLE 1

|  | I | II | III | IV | V | VI |
|---|---|---|---|---|---|---|
| Kind of current collector | $\beta$ | $\alpha$ | $\beta$ | $\alpha$ | $\beta$ | $\alpha$ |
| Kind of active material | A | A | B | B | C | C |

EXAMPLE 2

An aqueous solution comprising carboxymethyl cellulose as a viscosity improver was respectively added to a mixture of 60% by weight of the nickel hydroxide powder and 40% by weight of the cobalt monoxide powder (hereinafter simply referred to as D); a mixture of 60% by weight of the nickel hydroxide powder and 40% by weight of the nickel powder (hereinafter simply referred to as E); and a mixture of 80% by weight of the nickel hydroxide powder, 10% by weight of the cobalt monoxide powder and 30% by weight of the nickel powder (hereinafter simply referred to as F), to form another three kinds of slurry active materials.

These slurries were pasted to a nickel mesh current collector $\alpha$ of 80 $\mu$m wire diameter applied with plating of cobalt of 3 $\mu$m thickness and a nickel mesh current collector $\beta$ not applied with cobalt plating respectively, which were dried and pressed into nickel electrodes each of 600 $\mu$m (0.6 mm) thickness.

These nickel electrodes were combined with a pasted cadmium electrode as a counter electrode, to which KOH at d=1.26 was injected to obtain solution type cells. After leaving them for 24 hours, tests were conducted by charging at 0.1 CA×15 hr—discharging at 0.2 CA (final voltage: 1.00 V) at a temperature of 20° C. repeatedly for 10 cycles.

Figure 8:
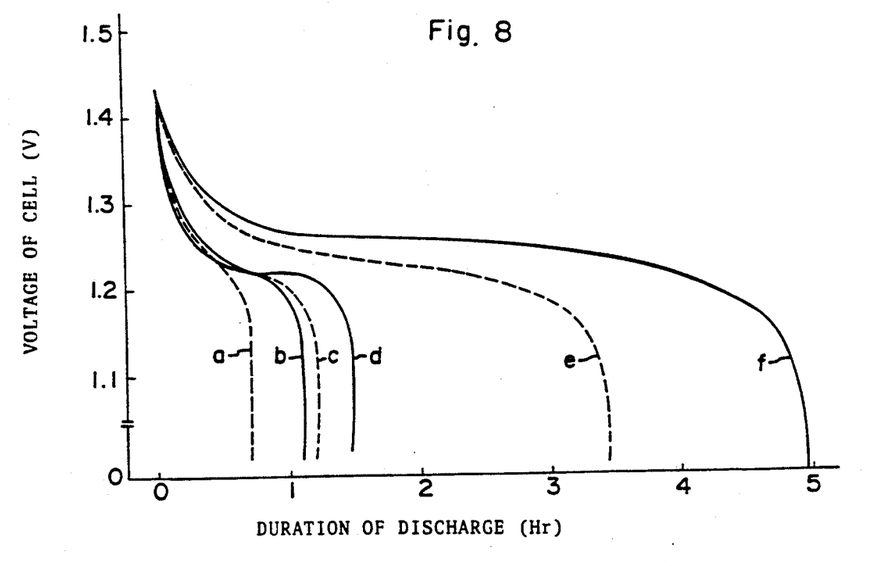

FIG. 8 shows cell discharge characteristics in respective cases. In the figure, conditions for the nickel electrodes a~f are shown in the following Table 2.

TABLE 1

|  | a | b | c | d | e | f |
|---|---|---|---|---|---|---|
| Kind of current collector | $\beta$ | $\alpha$ | $\beta$ | $\alpha$ | $\beta$ | $\alpha$ |
| Kind of active material | D | D | E | E | F | F |

EXAMPLE 3

An aqueous solution comprising carboxymethyl cellulose as a viscosity improver was respectively added to a mixture of 60% by weight of the nickel hydroxide powder, 10% by weight of the cobalt monoxide powder and 30% by weight of nickel short fibers about 1 mm fiber length (hereinafter simply referred to as G) and a mixture of 60% by weight of the nickel hydroxide powder, 10% by weight of the cobalt monoxide powder and 30% by weight of the nickel powder (hereinafter simply referred to as H), to form still another two kinds of slurry active materials.

These slurries were pasted to nickel mesh current collectors of 80 $\mu$m wire diameter applied with plating of cobalt of 3 $\mu$m thickness respectively, which were dried and pressed into nickel electrodes each of 600 $\mu$m (0.6 mm) thickness.

These nickel electrodes were combined with a pasted cadmium electrode as a counter electrode, to which KOH at d=1.26 was injected to obtain solution type cells. After leaving them for 24 hours, tests were conducted by charging at 0.1 CA×15 hr—discharging at 0.2 CA (final voltage: 1.00 V) at a temperature of 20° C. repeatedly for 10 cycles.

Figure 9:
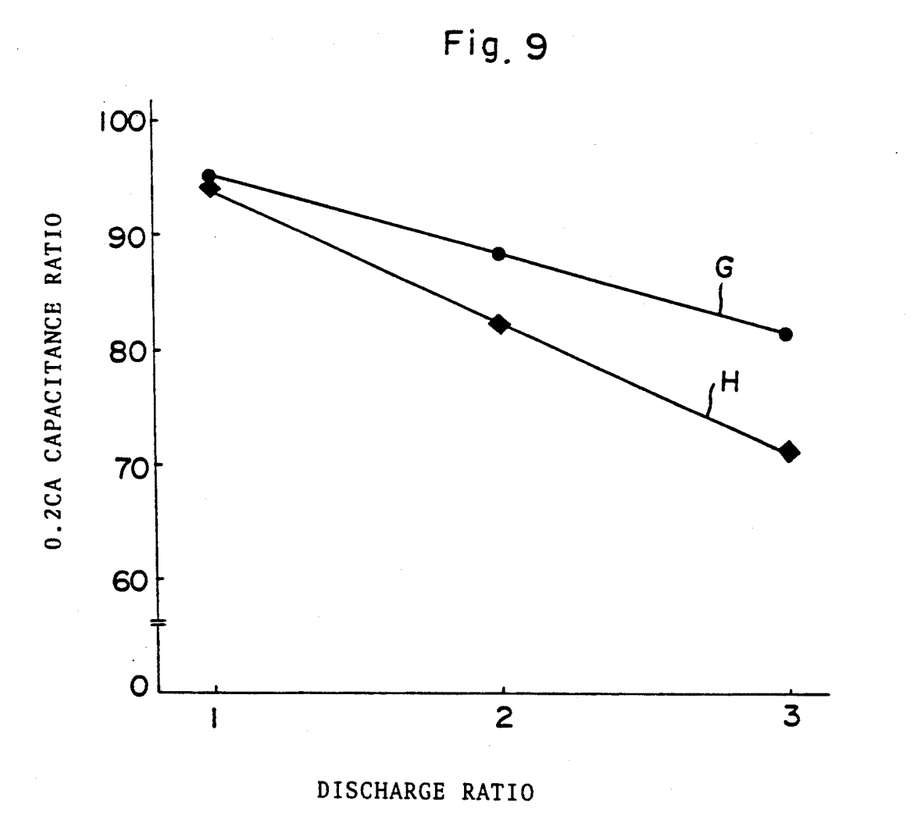
FIG. 9 shows an effect of the shape of the conductive material on the discharge rate.

FIG. 9 shows a relationship between the discharge rate and the capacity to 0.2 CA capacity in respective cases.

EXAMPLE 4

3% by weight of polytetrafluoroethylene as a binder was added to a mixture of 60% by weight of the nickel hydroxide powder, 10% by weight of the cobalt monoxide powder and 30% by weight of the carbon powder coated at the surface thereof with nickel, to form an active material sheet.

The active material sheet was press-bonded to a nickel mesh current collector of 80 $\mu$m wire diameter applied with plating of cobalt 3 $\mu$m thickness, which was dried and pressed into a nickel electrode of 600 $\mu$m (0.6 mm) thickness.

The nickel electrode was combined with a pasted cadmium electrode as a counter electrode, to which KOH at d=1.26 was injected to obtain a solution type cell. After leaving the cell for 24 hours, a test was conducted by charging at 0.1 CA×15 hr-discharging at 0.2 CA (final voltage: 1.00 V) at a temperature of 20° C. repeatedly for 10 cycles.

Figure 10:
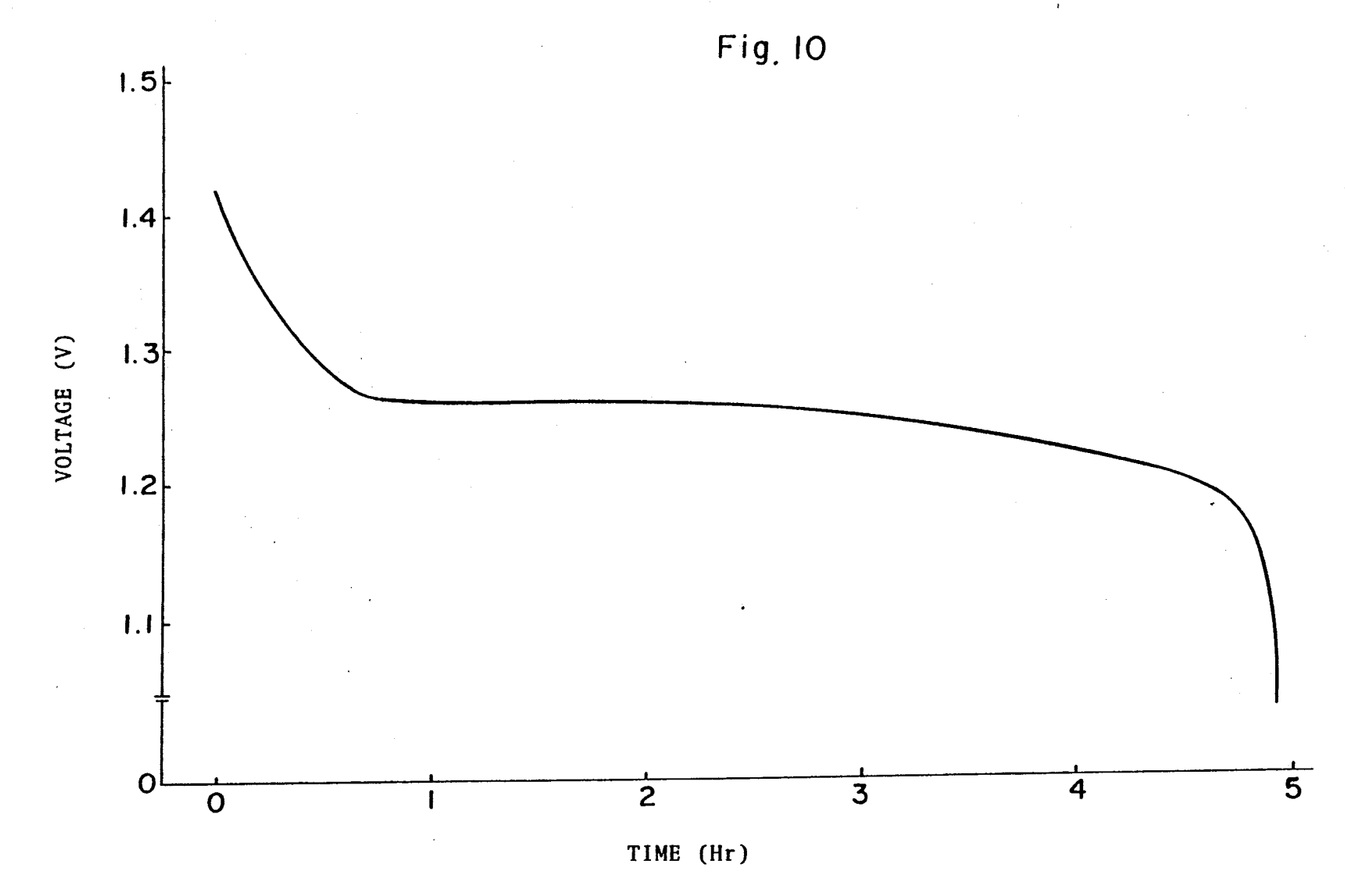
FIG. 10 shows cell discharge characteristics in a case of fabricating the active material to which the conductive material and cobalt monoxide are added in combination, into a sheet-like form.

FIG. 10 shows cell discharge characteristics in respective cases.

The method of adding cobalt monoxide alone to nickel hydroxide in Example 1 and 2 was used in the sintered metal fiber current collector, in which substantially 100% utilization ratio could be obtained. However, only about 25 to 30% of the utilization ratio could be obtained for the mesh current collector. Further, in the method of adding a carbon or nickel powder alone to nickel hydroxide, only about 80% utilization ratio could be obtained although a great amount was added even in a case of existent pocket-type and button-type nickel electrodes in which a greater amount was added than in the present invention. Moreover, the utilization ratio could be obtained only for about 40 to 50% in the case of carbon and 18 to 20% in the case of nickel for the mesh current collector. In the present invention's method of adding cobalt monoxide and the conductive material in combination, about 100% of utilization ratio could be obtained in both of the examples. Thus, this method is extremely effective for the mesh current collector.

Figure 11:
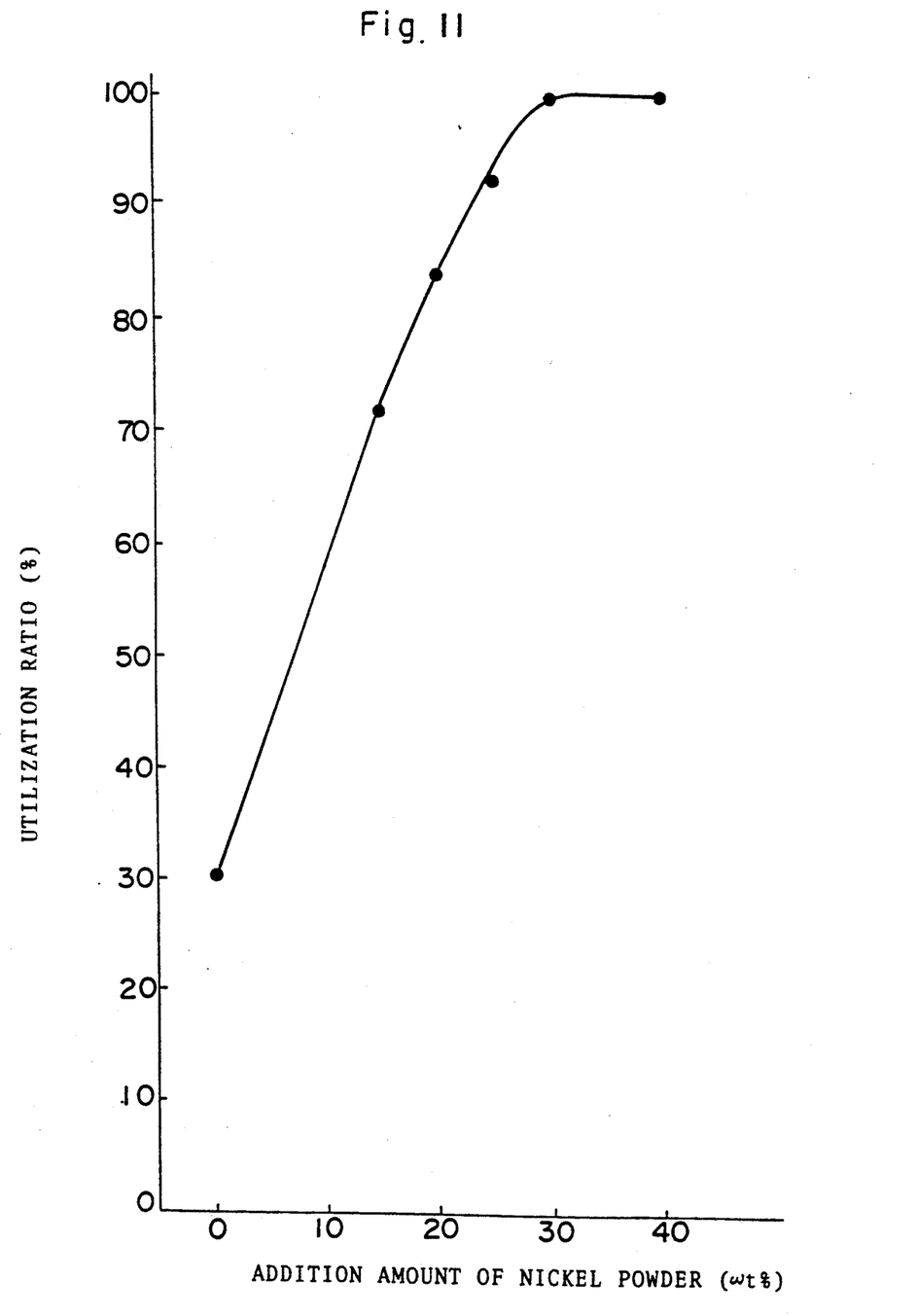
FIG. 11 shows a relationship between the addition amount of nickel powder and utilization ratio for the active material.
Figure 12:
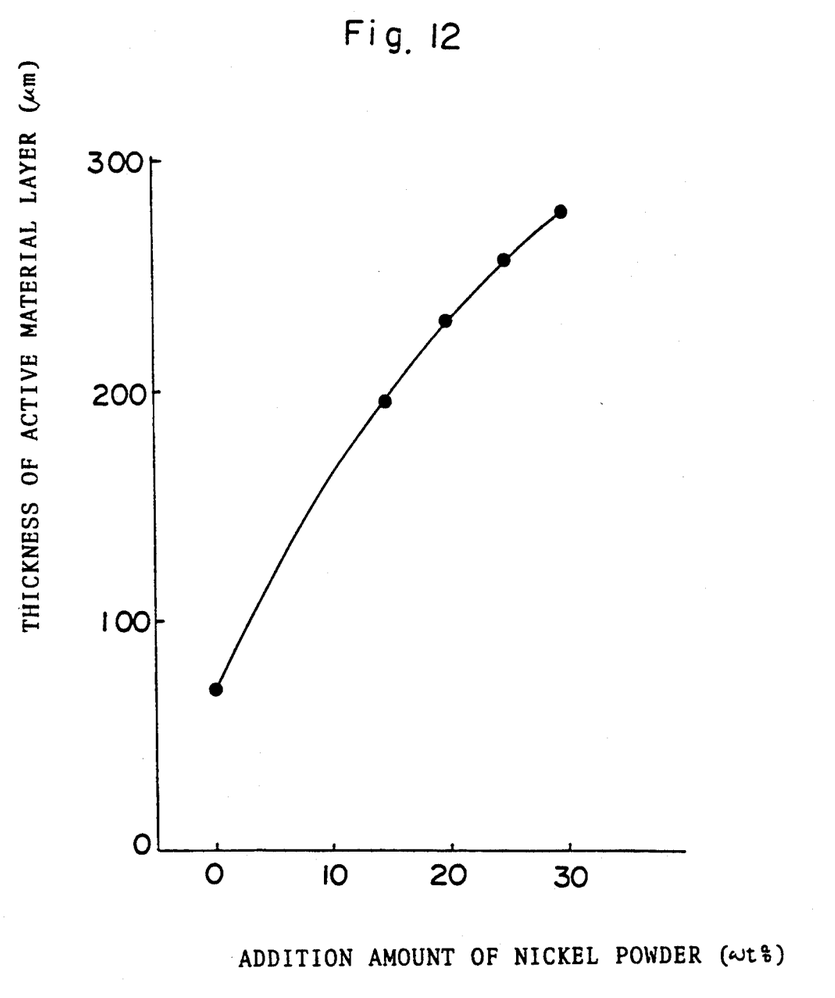
FIG. 12 shows a relationship between the effective distance of a conductive network and the addition amount of the conductive material.
Figure 13:
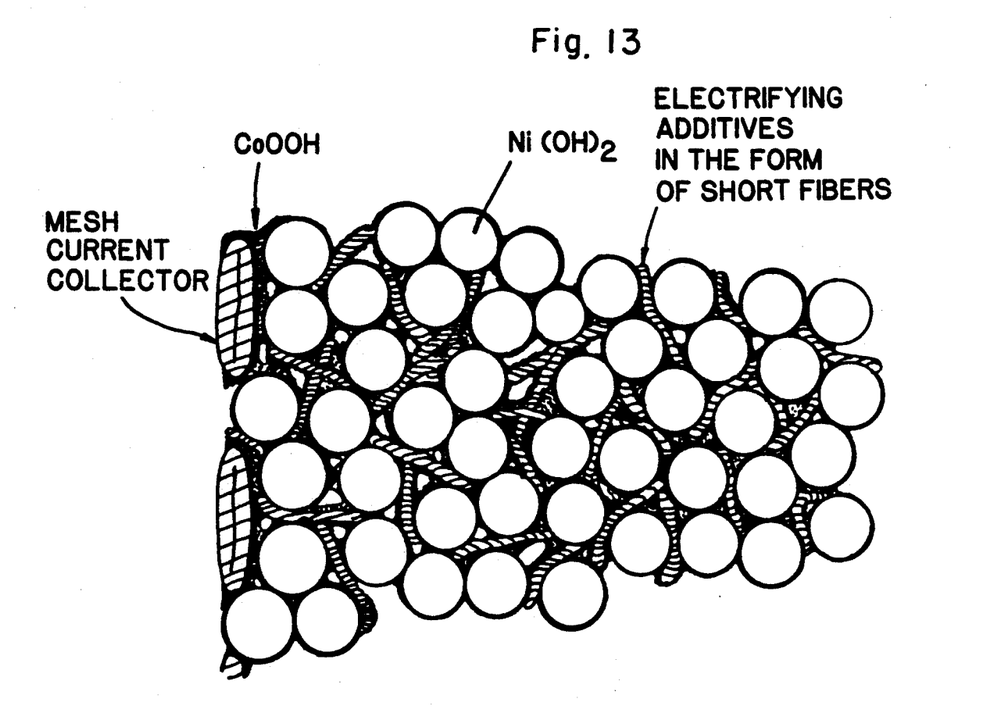
FIG. 13 shows a model, in cross section, of the nickel electrode using a mesh current collector with the boundary portion comprising the cobalt oxyhydroxide layer and the active material layer having the conductive network of oxyhydroxide assisted with the fiberous conductive material.

In the examples, since the total thickness of the electrode is 600 μm, the thickness of the active material layer from the current collector is about 300 μm. Since the effective distance of the conductive network of cobalt oxyhydroxide alone is considered to be about 70 to 80 μm, about 230 to 240 μm excepting the above-mentioned distance is compensated by the conductive material. In order to investigate the relationship between the effective distance compensated by the conductive material and the addition amount of the conductive material, the model experiment was made by changing the addition amount of the nickel powder. FIG. 11 shows the results. It can be seen from the figure that the utilization ratio is increased along with the increase in the addition amount of the nickel powder. Since the increase in the utilization ratio is considered to be attributable to the increase in the effective distance, it is possible to estimate, from this result, a relationship between the addition amount of the conductive material and the effective distance. FIG. 12 shows this relationship. It can be seen from the figure that an optimum addition amount is present depending on the thickness of the active material layer. For the shape and the size of the conductive material, an optimum condition is also considered to be present. For the shape, a short fiberous form is effective due to the synergistic effect as can be seen from Example 3 and they function extremely effective, in particular, in the high rate discharging as compared with the powdered form. Furthermore, throughout the examples, those applied with cobalt plating on the surface of the current collectors can provide more excellent utilization ratio as compared with those not applied. Accordingly, it is apparent that the boundary portion plays an important role for the utilization ratio. FIG. 13 shows a model, in cross section, of the nickel electrode using the mesh current collector with the boundary portion comprising the cobalt oxyhydroxide layer and the active material layer having the conductive network assisted with the fiberous conductive material.

In the above-mentioned examples, cobalt monoxide is used as the divalent cobalt compound, but $\alpha$—$Co(OH)_2$ and $\beta$—$Co(OH)_2$ may also be used with similar effect. Further, also in the case of the metal cobalt powder, a trend similar to that obtained in the case of the divalent cobalt compound powder can be observed although the effect is less as compared with the latter.

Further, although the mesh current collector was used in the foregoing examples, a more improved performance can be attained by the present invention for other existent electrodes having a great distance between the current collector and the active material, such as a nickel foil current collector, a button-type electrode, a pocket-type nickel electrode and a perforated steel sheet current collector.

Since the present invention can provide an inexpensive nickel electrode of high performance, great capacity and high productivity by coating the active material to a mesh current collector, it has a great industrial value.

What is claimed is:

1. A nickel electrode for an alkaline battery which comprises a plurality of metal wires connected together to provide a network-like, alkaline-proof metal mesh core; a highly conductive and electrochemically irreversible material covering said metal wires of said metal mesh core to a thickness of 2 to 5 μm, said highly conductive and electrochemically irreversible material comprising cobalt oxyhydroxide; and a layer of active material in which said metal mesh core with covering material extends, said highly conductive and electrochemically irreversible material providing a boundary between said metal wires and said layer of active material.

2. A nickel electrode for alkine batteries according to claim 1, wherein said metal wires providing said networklike, alkaline-proof metal mesh core are composed of nickel.

3. A nickel electrode for alkaline batteries according to claim 2, wherein said nickel wires comprise crushed hollow cores.

4. A nickel electrode for alkaline batteries according to claim 2, wherein said active material comprises a mixture of nickel hydroxide powder, at least one divalent cobalt compound, and a conductive material powder.

5. A nickel electrode for alkaline batteries according to claim 4, wherein said divalent cobalt compound is selected from the group consisting of $CoO$, $\alpha$—$Co(OH)_2$ and $\beta$—$Co(OH)_2$ 6. A nickel electrode for alkaline batteries according to claim 4, said conductive material powder is selected from the group consisting of nickel and carbon powders.

7. A nickel electrode for alkaline batteries according to claim 6, wherein the conductive additive is in the form of short fibers.

8. A nickel electrode according to claim 6, wherein said cobalt oxyhydroxide is formed by applying cobalt to said nickel wires and then electrochemically converting it to cobalt oxyhydroxide.

* * * * *